US011551184B2

(12) United States Patent
Acharya et al.

(10) Patent No.: US 11,551,184 B2
(45) Date of Patent: Jan. 10, 2023

(54) AGGREGATED AND DISTRIBUTED INVENTORY AVAILABILITY

(71) Applicant: salesforce.com, Inc., San Francisco, CA (US)

(72) Inventors: Sanjay Acharya, San Francisco, CA (US); Robert Libby, San Francisco, CA (US); Christopher Lish, San Francisco, CA (US); Benjamin Busjaeger, San Francisco, CA (US); Balachandar Mariappan, San Francisco, CA (US); Amanda Hatker, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 145 days.

(21) Appl. No.: 16/139,828

(22) Filed: Sep. 24, 2018

(65) Prior Publication Data

US 2020/0097893 A1     Mar. 26, 2020

(51) Int. Cl.
| | |
|---|---|
| *G06Q 10/00* | (2012.01) |
| *G06Q 30/00* | (2012.01) |
| *G06F 15/16* | (2006.01) |
| *G06Q 10/08* | (2012.01) |
| *H04L 67/10* | (2022.01) |
| *G06F 9/54* | (2006.01) |
| *G06F 16/958* | (2019.01) |
| *G06F 16/9535* | (2019.01) |

(52) U.S. Cl.
CPC .......... *G06Q 10/087* (2013.01); *G06F 9/542* (2013.01); *G06F 16/958* (2019.01); *G06F 16/9535* (2019.01); *H04L 67/10* (2013.01)

(58) Field of Classification Search
CPC ................ G06Q 10/087; G06F 16/958; G06F 16/9535; G06F 9/542; H04L 67/10
See application file for complete search history.

(56) References Cited

U.S. PATENT DOCUMENTS

| | | | | |
|---|---|---|---|---|
| 6,438,538 | B1 * | 8/2002 | Goldring | G06F 16/24556 |
| 7,148,800 | B2 * | 12/2006 | Cunningham | G06Q 10/087 |
| | | | | 705/28 |
| 7,398,232 | B2 * | 7/2008 | Renz | G06Q 10/087 |
| | | | | 705/28 |
| 7,725,366 | B1 * | 5/2010 | Franco | G06Q 10/08 |
| | | | | 705/28 |
| 8,332,285 | B1 * | 12/2012 | Barua | G06Q 10/087 |
| | | | | 705/28 |
| 8,386,323 | B1 * | 2/2013 | Chenault | G06Q 30/06 |
| | | | | 705/28 |

(Continued)

*Primary Examiner* — Talia F Crawley
(74) *Attorney, Agent, or Firm* — Butzel Long; Donald J. Lecher

(57) ABSTRACT

A method of inventory data aggregation and delivery over a distributed network comprises generating inventory data with respect to plural disparate sources, and publishing that data over a distributed network to an event processor. The method further includes receiving the published inventory data through subscription to the event processor and distributing it to a plurality of requesting devices, e.g., client devices, over the distributed network. This can include aggregating and filtering by locale or product-type the inventory data in response to requests received from those devices. This can further include reducing the aggregated, filtered data to accommodate inventory reserves, e.g., of retail outlets.

9 Claims, 2 Drawing Sheets

(56) References Cited

U.S. PATENT DOCUMENTS

| | | | |
|---|---|---|---|
| 8,392,998 B1* | 3/2013 | Schrecker | H04L 63/1416 709/224 |
| 9,165,278 B2* | 10/2015 | Vasantham | G06Q 10/087 |
| 9,336,509 B1* | 5/2016 | Arun Singhal | G06Q 10/087 |
| 2008/0010171 A1* | 1/2008 | Ghanma | G06Q 30/0603 705/28 |
| 2010/0106609 A1* | 4/2010 | Sherman | G06Q 20/202 705/28 |
| 2011/0227709 A1* | 9/2011 | Story | B60R 25/102 340/10.42 |
| 2012/0123674 A1* | 5/2012 | Perks | G06Q 30/0631 705/26.7 |
| 2012/0303411 A1* | 11/2012 | Chen | G06Q 10/087 705/7.31 |
| 2014/0279241 A1* | 9/2014 | Bartholomew | G06Q 30/0623 705/26.61 |
| 2014/0330685 A1* | 11/2014 | Nazzari | G06Q 10/083 705/28 |
| 2014/0374478 A1* | 12/2014 | Dearing | G06Q 10/083 235/385 |
| 2016/0055448 A1* | 2/2016 | Ellis | G06Q 10/087 705/28 |
| 2016/0189174 A1* | 6/2016 | Heath | G06Q 30/0201 705/7.29 |
| 2016/0364681 A1* | 12/2016 | Andrus | G06Q 10/087 |
| 2017/0083967 A1* | 3/2017 | Shiely | G06Q 30/0639 |
| 2018/0012166 A1* | 1/2018 | Devadas | G06Q 10/06315 |
| 2018/0189725 A1* | 7/2018 | Mattingly | G09F 21/048 |
| 2018/0211718 A1* | 7/2018 | Heath | A01K 29/005 |
| 2018/0268330 A1* | 9/2018 | Konanur | G06Q 10/04 |
| 2019/0180581 A1* | 6/2019 | Marszalek | E05B 73/0005 |
| 2019/0318417 A1* | 10/2019 | Gumaru | G06Q 30/0635 |
| 2020/0090119 A1* | 3/2020 | Shiely | G06Q 10/0835 |
| 2020/0143313 A1* | 5/2020 | Ohlsson | G06N 5/003 |

* cited by examiner

AGGREGATED AND DISTRIBUTED INVENTORY AVAILABILITY

BACKGROUND

The invention pertains to data aggregation and distribution. It has application, by way of nonlimiting example, in making inventory data from disparate sources available over a distributed network.

The growth of e-commerce, the rise of chain stores, the internationalization of supply networks, and the popularity of just-in-time manufacturing pose a perfect storm for "connected" retailers—i.e., those with a web presence through which to advertise and sell products. No longer are prospective purchasers satisfied knowing that an item of interest is available through a retailer, they want to know that its available for shipping now and, better, that it is available for immediate pick-up at a brick-and-mortar outlet the next town over.

For the retailer, that kind of data can be hard to come by, at least with the speed demanded by today's consumers. Telling a frustrated customer that the "hurry—only three more available" message on the website was accurate 24 hours ago is not good for business. The art has suggested various solutions, but they have not proven satisfactory.

BRIEF DESCRIPTION OF THE DRAWINGS

A more complete understanding of the discussion that follows may be attained by reference to the drawings, in which.

DETAILED DESCRIPTION OF THE ILLUSTRATED EMBODIMENT

Figure 1:
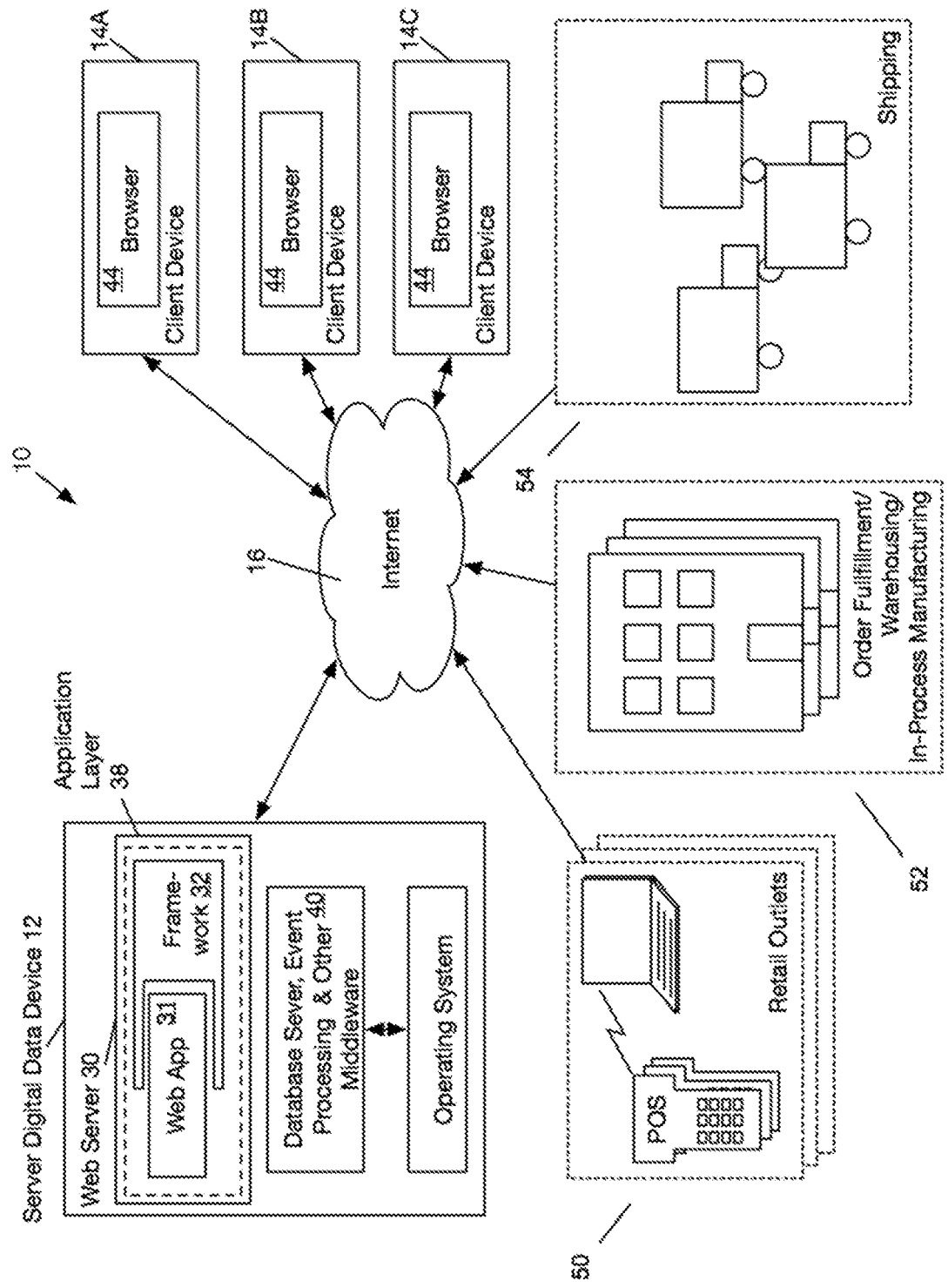
FIG. 1 depicts an environment in which an embodiment is employed.

FIG. 1 depicts a digital data processing system 10 that includes a server digital data device ("server") 12 coupled to client digital data devices ("clients") 14A-14C via a network 16. By way of non-limiting example, illustrated server 12 hosts an e-commerce portal or platform (collectively, "platform") of an online retailer, and clients 14A-14C are digital devices (e.g., smart phones, desktop computers, and so forth) of customers of that retailer and other users (collectively, "users") of that platform.

Devices 12, 14A-14C comprise conventional desktop computers, workstations, minicomputers, laptop computers, tablet computers, PDAs, mobile phones or other digital data devices of the type that are commercially available in the marketplace, all as adapted in accord with the teachings hereof. Thus, each comprises central processing, memory, and input/output subsections (not shown here) of the type known in the art and suitable for (i) executing software of the type described herein and/or known in the art (e.g., applications software, operating systems, and/or middleware, as applicable) as adapted in accord with the teachings hereof and (ii) communicating over network 16 to other devices 12, 14A-14C in the conventional manner known in the art as adapted in accord with the teachings hereof.

Examples of such software include web server 30 that executes on device 12 and that responds to requests in HTTP or other protocols from clients 14A-14C (and, more particularly, from the users thereof) for transferring web pages, downloads and other digital content to the requesting device over network 16, in the conventional manner known in the art as adapted in accord with the teachings hereof. Web server 30 includes web application 31 that includes a data-aggregating and distributing function that may be part of broader functionality provided by the web application 31 such as, for example, serving up a web site or web service (collectively, "web site") to client devices, all per convention in the art as adapted in accord with the teachings hereof.

In the illustrated embodiment, that web site is, by way of non-limiting example, an e-commerce site of a retailer, e.g., for advertising and selling goods to its customers, and the data-aggregating and distributing function is, by way of non-limiting example, an inventory function that aggregates data regarding inventory available to those customers from the disparate sources from which the retailer obtains goods for customer order and/or purchase, all per convention in the art as adapted in accord with the teachings hereof. In the illustrated embodiment, those sources comprise brick-and-mortar outlets 50, order fulfillment, warehousing, and/or in-process manufacturing locations 52, and in-transit shipping 54, though, other embodiments may vary in this regard.

Web framework 32 comprises conventional such software known in the art (as adapted in accord with the teachings hereof) providing libraries and other reusable services that are (or can be) employed—e.g., via an applications program interface (API) or otherwise—by multiple and/or a variety of web applications executing on the platform supported by server 12, one of which applications is shown here (to wit, web application 31).

In the illustrated embodiment, web server 30 and its constituent components, web application 31 and framework 32, execute within an application layer 38 of the server architecture. That layer 38, which provides services and supports communications protocols in the conventional manner known in the art as adapted in accord with the teachings hereof, can be distinct from other layers in the server architecture—layers that provide services and, more generally, resources (a/k/a "server resources") that are required by the web application 31 and/or framework 32 in order to process at least some of the requests received by server 30 from clients 14A-14C and to obtain inventory (and/or other) data for aggregation, e.g., from outlets 50, locations 52, and so forth, all per convention in the art as adapted in accord with the teachings hereof.

Those other layers include, for example, a data layer (which provides services supporting interaction with a database server 40, an event processing framework 62 (FIG. 2) or other middleware in the conventional manner known in the art as adapted in accord with the teachings hereof) and the server's operating system 42 (which manages the server hardware and software resources and provides common services for software executing thereon in the conventional manner known in the art as adapted in accord with the teachings hereof). Other embodiments may utilize an architecture with a greater or lesser number of layers and/or with layers providing different respective functionalities than those illustrated here.

Though described herein in the context of a web site, in other embodiments web server 30 and applications 31 and 32 may define a web service or other functionality (e.g., available through an API or otherwise) suitable for responding to user requests, e.g., a video server, a music server, or otherwise. And, though shown and discussed here as comprising a separate web application 31 and framework 32, in other embodiments, the web server 30 may combine the functionality of illustrated components 31 and 32 in a single component or distribute it among still more components.

With continued reference to FIG. 1, client devices 14A-14C of the illustrated embodiment execute web browsers 44 that (typically) operate under user control to generate requests in HTTP or other protocols, e.g., to access web sites on the aforementioned platform, to search for goods available on, through or in connection with that platform (e.g., goods available from a web site retailer—whether online and/or through its brick-and-mortar outlets), to advance-order or request the purchase (or other acquisition) of those goods, and so forth, and to transmit those requests to web server 30 over network 14—all in the conventional manner known in the art as adapted in accord with the teachings hereof. Though referred to here as web browsers, in other embodiments applications 44 may comprise web apps or other functionality suitable for transmitting requests to a server 30 and/or presenting content received therefrom in response to those requests, e.g., a video player application, a music player application or otherwise.

The devices 12, 14A-14C of the illustrated embodiment may be of the same type, though, more typically, they constitute a mix of devices of differing types. And, although only a single server digital data device 12 is depicted and described here, it will be appreciated that other embodiments may utilize a greater number of these devices, homogeneous, heterogeneous or otherwise, networked or otherwise, to perform the functions ascribed hereto to web server 30 and/or digital data processor 12. Likewise, although three client device 14A-14C are shown, it will be appreciated that other embodiments may utilize a greater or lesser number of those devices, homogeneous, heterogeneous or otherwise, running applications (e.g., 44) that are, themselves, as noted above, homogeneous, heterogeneous or otherwise. Moreover, one or more of devices 12, 14A-14C may be configured as and/or to provide a database system (including, for example, a multi-tenant database system) or other system or environment; and, although shown here in a client-server architecture, the devices 12, 14A-14C may be arranged to interrelate in a peer-to-peer, client-server or other protocol consistent with the teachings hereof.

Retail outlets 50 comprise one or more brick-and-mortar or other facilities from which customers can obtain goods per convention in the art as adapted in accord with the teachings hereof. Illustrated outlets 50 include (or are otherwise associated with) digital data processing equipment coupled to network 16 for transferring information, e.g., to server 12 or otherwise, regarding inventory availability per convention in the art as adapted in accord with the teachings hereof. The outlets can include point-of-sale (POS) terminals, back-office or other digital data processing equipment (not shown) capable of at least generating and transmitting on network 16 information to that server 12 or otherwise regarding (i) on-hand inventory, (ii) inventory subject to in-process orders (e.g., inventory on reserve for customers while awaiting order completion and/or payment), and/or (iii) inventory in reserve for demonstration or display to prospective customers and, thus, not available for purchase. Such information can be collected and generated at the respective outlets in the conventional manner known in the art as adapted in accord with the teachings hereof (e.g., via POS logging, attendant-equipped bar scanners, etc.) on a per-SKU (stock-keeping unit), per-UPC (universal product code), or other basis, again, per convention in art as adapted in accord with the teachings hereof. The transmission of such data on network 16 is within the ken of those skilled in the art as informed by the teachings hereof.

Locations 52 comprise one or more order fulfillment, warehousing, in-process manufacturing or other locations from which a retailer can obtain a supply of goods to reasonably meet customer orders. As above, illustrated locations 52 include (or are otherwise associated with) digital data processing equipment coupled with network 16 for generating and/or transferring information, e.g., to server 12 or otherwise, regarding inventory availability per convention in the art as adapted in accord with the teachings hereof. This can include inventory that is ready for shipment directly to customers and/or to retail outlets 50, as well as inventory for which manufacturing is (or can be) in-process and, thus, can also be ready for shipment in reasonable time, all per convention in the art as adapted in accord with the teachings hereof. As above, such information can be collected and generated at the respective locations 52 in the conventional manner known in the art as adapted in accord with the teachings hereof, e.g., on a per-SKU, per-UPC, or other basis, and it can be transmitted on network 16 in a conventional manner known in the art, again, too, as adapted in accord with the teachings hereof.

In transit shipping 54 comprise one or more transports via which goods are routed to and between outlets 50 and locations 52 per convention in the art as adapted in accord with the teachings hereof. These include (or are otherwise associated with) digital data processing and/or other equipment, including for example RFID-equipped or otherwise sensorized pallets, containers and the like, suitable for generating and/or transferring information, e.g., to server 12 or otherwise, regarding inventory availability per convention in the art as adapted in accord with the teachings hereof. This can include inventory that is currently en route and/or is being readied therefor, as well as inventory that has been delivered and is being readied for stocking at an outlet 50 or location 52, all per convention in the art as adapted in accord with the teachings hereof. As above, such information can be collected and generated in connection with shipping in the conventional manner known in the art as adapted in accord with the teachings hereof, e.g., on a per-SKU, per-UPC, or other basis, and it can be transmitted on network 16 in a conventional manner known in the art, again, too, as adapted in accord with the teachings hereof.

Network 16 is a distributed network comprising one or more networks suitable for supporting communications between server 12 and client device 14A-14C. The network comprises one or more arrangements of the type known in the art, e.g., local area networks (LANs), wide area networks (WANs), metropolitan area networks (MANs), and or Internet(s). Although a client-server architecture is shown in the drawing, the teachings hereof are applicable to digital data devices coupled for communications in other network architectures.

As those skilled in the art will appreciate, the "software" referred to herein—including, by way of non-limiting example, web server 30 and its constituent components, web application 31 and web application framework 32, browser 44—comprise computer programs (i.e., sets of computer instructions) stored on transitory and non-transitory machine-readable media of the type known in the art as adapted in accord with the teachings hereof, which computer programs cause the respective digital data devices, e.g., 12, 14A-14C to perform the respective operations and functions attributed thereto herein. Such machine-readable media can include, by way of non-limiting example, hard drives, solid state drives, and so forth, coupled to the respective digital data devices 12, 14A-14C in the conventional manner known in the art as adapted in accord with the teachings hereof.

Figure 2:
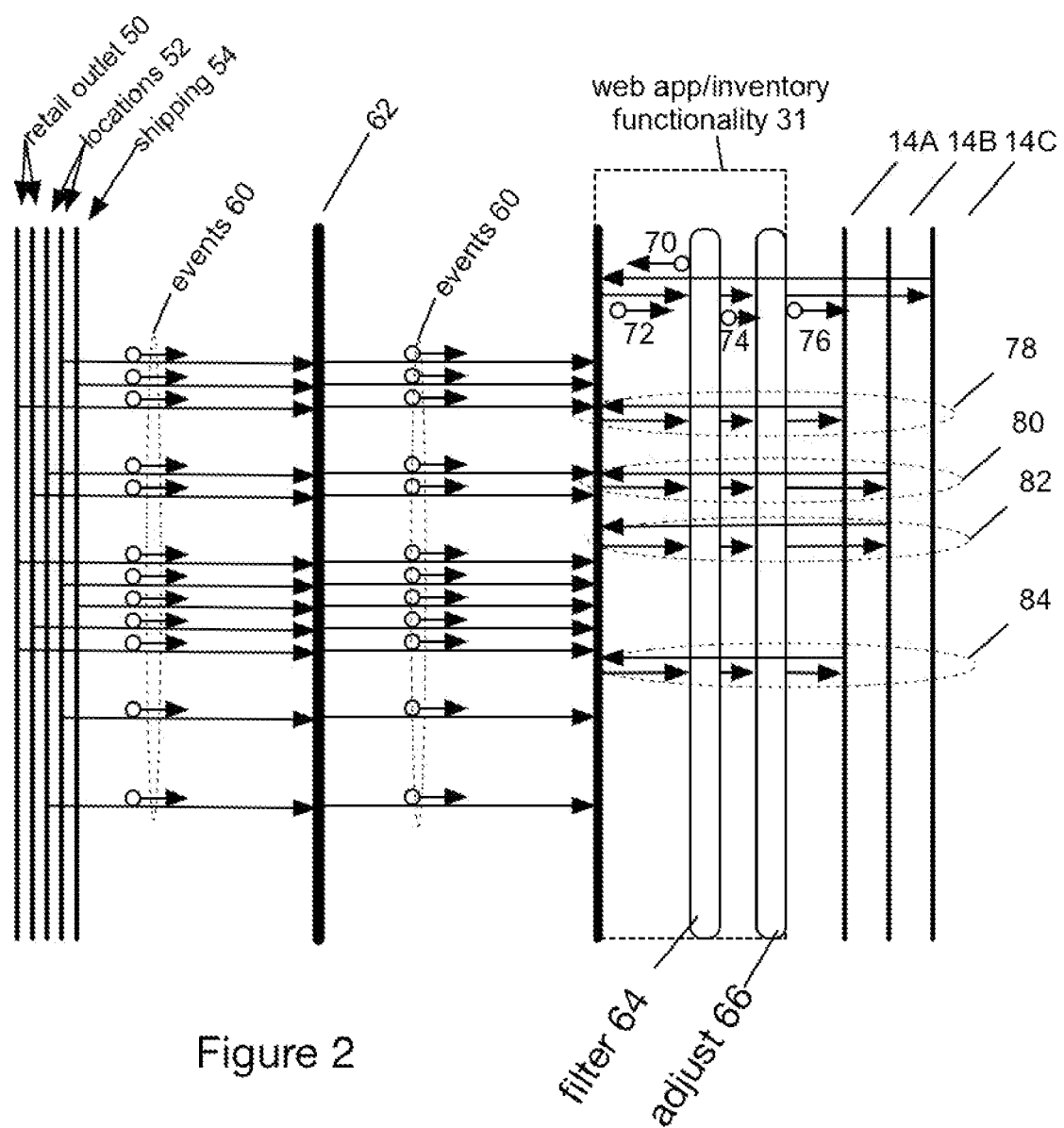
FIG. 2 depicts an embodiment for inventory data aggregation and distribution.

Described below in connection with FIG. 2 is operation of the web application 31, working in cooperation with framework 32 and the other components of server 12, as well as with browsers 44 and other components of client devices 14A-14C, and as well as with digital data processing equipment at the retail outlets 50, locations 52 and shipping transports 54. Although the steps described below are ascribed to various ones of those elements, it is within the ken of those skilled in the art to execute some or more of those steps on other ones of those elements consistent with the teachings hereof.

Referring to FIG. 2, the respective digital data processing equipment of outlets 50, locations 52 and shipping transports 54 of the illustrated embodiment transfer respective inventory data to server 12 via a publish-and-subscribe event processing protocol of the type commercially available in the marketplace as adapted in accord with the teachings hereof. Thus, each such outlet 50, location 52 and/or shipping transport 54 generates and transmits an "event" 60 to network 16 with each inventory change. Those events can reflect then-current totals of inventory at the respective outlets 50, locations 52 and/or transports 54, or incremental changes therein, per convention in the art as adapted in accord with the teachings hereof. By way of non-limiting example, the published (or otherwise transferred) information can include (i) on-hand inventory, (ii) inventory subject to in-process orders, and/or (iii) inventory required for reserve at each of outlets 50, as well as inventory reasonably available for shipping from locations 52 and/or in transit via transports 54.

The event processing framework (or "event processor") 62, executing in the data layer of server 12, logs and distributes those events 60 on a stream/broadcast and/or on-request basis to subscribing devices and/or processes, per convention in the art as adapted in accord with the teachings hereof. In the illustrated embodiment, the aforementioned inventory functionality of web application 31 is configured as one such a subscriber, again per convention in the art as adapted in accord with the teachings hereof. Although the illustrated embodiment utilizes event processing for transferring inventory data from outlets 50, locations 52 and transports 54 to inventory functionality/web application 31, other embodiments may utilize other data transfer methods known in the art for such purpose, instead or in addition.

The inventory functionality 31, in turn, aggregates and distributes the inventory data to requesting ones of the client devices 14A-14C. This can be in response to requests generated by their respective web browsers 44 (e.g., at the behest of their respective users or otherwise), as per convention in the art as adapted in accord with the teachings hereof. In addition to aggregating that data, functionality 31 can impose filter 64 to limit the aggregated inventory data to meet specifics of each request—e.g., for data pertaining to a specific outlet 50 or outlets, location 52 or locations, or transport 54 or transports (e.g., in a geographic area or otherwise), for data pertaining to specific goods (e.g., as specified by SKU, UPC or otherwise), as specified by such requests and as within the ken of those skilled in the art in view of the teachings hereof. Moreover, the functionality can impose adjustment 66 to reduce the amount of any aggregation to accommodate inventory required for reserve at outlets 50.

Thus, by way of example, browser 44 of client device 14C can generate a request for availability in inventory of a specific running shoe at retail outlets 50 and warehouses 52 in the Houston area. That request can be made explicitly by a user of device 14C or, alternatively, can be generated on the user's behalf by client-side code, injected or otherwise. Regardless, in response, application/functionality 31 can aggregate data 72 published to the event processing framework 62, imposing filter 64 to limit the aggregation to data 74 (i) from outlets 50 and warehouses 52 in that locale and (ii) pertaining to that shoe. The functionality 31 can, moreover, reduce 66 that filtered aggregation to accommodate inventory required for reserve at the respective retail outlets 50 (e.g., in accord with amounts published by them to the framework 62). The functionality can transfer that filtered, reduced aggregated data 76 to the requesting browser for presentation to the user via browser 44 of device 14C.

This scenario can be repeated by devices 14A-14C, each time their respective browsers request inventory data at the behest of their respective users or otherwise. Of course, those requests need not be limited to the specifics of the example above but, rather, can be for inventory data filtered in other ways, if at all, e.g., by locale, product and so forth, with or without inventory reserve reductions as per the demands of each user. The requests by those devices 14A-14C and the responses by web application/functionality 31 are identified by transactions 78-84 in the drawing.

In order to reduce contention when updating records during high load on the system, some embodiments utilize the known pattern of event sourcing. In such embodiments, the framework 62, server 12, and/or inventory module 31A store events to represent changes in inventory. These are aggregated together in insertion order, resulting in a view of inventory details at the time of the most recently aggregated event.

Some embodiments aggregate inventory availability for a group of physical facilities, e.g. locations 52 and outlets 50, in a way that minimizes the impact of selling more stock than is available. The following pseudo code describes such an implementation. ATSI represents the Available to Sell Inventory for a specific stock unit. G represents a group of physical facilities. "Physical" stock is quantity on hand, "committed" is inventory that has been purchased and may or may not yet be shipped, and "safety stock" is inventory reserves that reduce the available count as described above. Although the following pseudo code details specific algorithms by way of example, it will be appreciated that other algorithms may be utilized to achieve like results.

```
ATSI (G):
   for all locations L in G:
      sum L's physical—committed—safety stock—into
         TOTAL_AVAILABLE
      collect all groups to which L belongs into INTER-
         SECTING_GROUP_SET
   for all groups H in INTERSECTING_GROUP_SET:
      for all locations K in both groups H and G:
         sum K's physical—committed—safety_stock into
            INTERSECTING_AVAILABLE
         subtract the lesser of (INTERSECTING_AVAILABLE
            and H. committed) from TOTAL_AVAILABLE
   return TOTAL_AVAILABLE, rounding up to 0 if nega-
      tive
ATSI (L):
   put L's physical—committed—safety stock into LOW-
      EST_AVAILABILITY for all groups G to which L
      belongs:
      Replace LOWEST_AVAILABILITY with ATSI (G) if
         ATSI (G) is lower return LOWEST_AVAILABIL-
         ITY
```

Described above and shown in the drawings are apparatus, systems and method for distributed inventory data aggregation and distribution. It will be appreciated that the embodiments shown here are merely examples and that others fall within the scope of the invention. Thus, by way of non-limiting example, although the discussion above refers to inventory reserves in the context of retail outlets 50, it will be appreciated such in some embodiments such reserves can be provided for vis-à-vis locations 52 and transports 52. Moreover, although in the discussion above, inventory data received from the outlets 50, locations 52 and transports 54 is aggregated and filtered before it is reduced in accord with such inventory reserves, the reduction can be implemented prior to aggregation and/or filtering without varying from the spirit hereof. Still further, although the inventory reserves are published by the outlets 50 (and, potentially, by the locations 52 and transports 54) in the embodiments described above, such reserves can implemented as default values (or otherwise) maintained, e.g., by functionality 31. These and other variations are contemplated by the claims, as set forth below.

In view of the foregoing, what is claimed is:

1. A method of data aggregation and delivery over a distributed network, comprising:
    with digital data processing equipment associated with plural disparate sources, generating inventory data of retail products with respect to the plural disparate sources, wherein the inventory data comprises,
        from a retail outlet source, inventory for sale, inventory subject to in-process orders being held for customers while awaiting order completion, and reserve inventory of retail products being used for demonstration or display to customers and not available for purchase,
        from a supply location source, inventory available for shipping, and
        from a transit service source, inventory available for delivery or currently in transit to the retail outlet source;
    with the digital data processing equipment associated with the plural disparate sources, publishing the inventory data over the distributed network to an event processor;
    aggregating the received inventory data at the event processor;
    filtering the aggregated inventory data in response to receiving a request from a requesting device, wherein the request from the requesting device corresponds to the aggregated data and includes one of a search for goods, an advance order for goods, or a request to purchase goods, wherein filtering the aggregated inventory data is based on filter data within the received request corresponding to
        a geographic area including a plurality of retail outlet sources including the retail outlet source,
        the supply location source from which the retail outlet source obtains a supply of retail goods, and
        the transit service source that routes the retail goods between the supply location source and the retail outlet source;
    reducing the filtered inventory data with the reserve inventory at the retail outlet source; and
    distributing the reduced and filtered inventory data to the requesting device over the distributed network.

2. The method of claim 1, comprising presenting the aggregated, filtered inventory data on the requesting device.

3. A method of inventory data aggregation and delivery over a distributed network, comprising:
    with digital data processing equipment associated with plural disparate sources, generating inventory data of retail products with respect to the plural disparate sources, wherein the inventory data comprises,
        from a retail outlet source, inventory for sale, inventory subject to in-process orders being held for customers while awaiting order completion, and reserve inventory of retail products being used for demonstration or display to customers and not available for purchase,
        from a supply location source, inventory available for shipping from at least one of an order fulfillment source, a warehouse source, or an in-process manufacturing source, and
        from transit service source, inventory including at least one of inventory in transit, inventory being readied for transit, or inventory delivered to at least one of the retail outlet source, the order fulfillment source, or the warehouse source;
    with the digital data processing equipment associated with the plural disparate sources, publishing the inventory data over a distributed network with respect to the plural disparate sources to an event processor;
    aggregating the received inventory data at the event processor;
    filtering the aggregated inventory data in response to receiving a request from a requesting device of a plurality of requesting devices, wherein the request from the requesting device corresponds to the aggregated inventory data and includes one of a search for goods in inventory, an advance order for goods in inventory, or a request to purchase goods in inventory, wherein filtering the aggregated inventory data is based on filter data within the received request corresponding to
        a geographic area including a plurality of retail outlet sources including the retail outlet source,
        the supply location source from which the retail outlet source obtains a supply of retail goods, and
        the transit service source that routes the retail goods between the supply location source and the retail outlet source;
    reducing the filtered inventory data with the reserve inventory at the retail outlet source; and
    distributing the reduced and filtered inventory data to the requesting device over the distributed network.

4. The method of claim 1, comprising presenting the filtered inventory data on the requesting device.

5. The method of claim 1, wherein the aggregating and filtering further include aggregating the inventory data as a function of one or more locations from which the inventory data was sourced and as a function of the reserve inventory associated with one or more of those locations.

6. A machine readable storage medium having stored thereon a computer program configured to cause a digital data device to perform:
    with digital data processing equipment associated with plural disparate sources, generating inventory data of retail products with respect to the plural disparate sources, wherein the inventory data comprises,
        from a retail outlet source, inventory for sale, inventory subject to in-process orders being held for customers while awaiting order completion, and reserve inventory of retail products being used for demonstration or display to customers and not available for purchase, from a supply location source, inventory available for shipping from at least one of an order fulfillment source, a warehouse source, or an in-process manufacturing source, and from transit service source, inventory including at least one of inventory in transit, inventory being readied for transit, or inventory delivered to at least one of the retail outlet source, the order fulfillment source, or the warehouse source;

with the digital data processing equipment associated with the plural disparate sources, publishing the inventory data over a distributed network to an event processor;

aggregating the received inventory data at the event processor;

filtering the aggregated inventory data in response to receiving a request from a requesting device of a plurality of requesting devices, wherein the request from the requesting device corresponds to the inventory data and includes one of a search for goods in inventory, an advance order for goods in inventory, or a request to purchase goods in inventory, wherein filtering the aggregated inventory data is based on filter data within the received request corresponding to a geographic area including a plurality of retail outlet sources including the retail outlet source, the supply location source from which the retail outlet source obtains a supply of retail goods, and the transit service source that routes the retail goods between the supply location source and the retail outlet source;

reducing the filtered inventory data with the reserve inventory at the retail outlet source; and distributing the reduced and filtered inventory data to the requesting device over the distributed network.

7. The method of claim 6, further comprising presenting the filtered inventory data on the requesting device.

8. Computer instructions configured to cause digital data apparatus to perform:

with digital data processing equipment associated with plural disparate sources, generating inventory data of retail products with respect to the plural disparate sources, wherein the inventory data comprises, from a retail outlet source, inventory for sale, inventory subject to in-process orders being held for customers while awaiting order completion, and reserve inventory of retail products being used for demonstration or display to customers and not available for purchase, from a supply location source, inventory available for shipping from at least one of an order fulfillment source, a warehouse source, or an in-process manufacturing source, and from transit service source, inventory including at least one of inventory in transit, inventory being readied for transit, or inventory delivered to at least one of the retail outlet source, the order fulfillment source, or the warehouse source;

with the digital data processing equipment associated with the plural disparate sources, publishing the inventory data over a distributed network to an event processor;

aggregating the received inventory data at the event processor;

filtering the aggregated inventory data in response to receiving a request from a requesting device of a plurality of requesting devices, wherein the request from the requesting device corresponds to the inventory data and includes one of a search for goods in inventory, an advance order for goods in inventory, or a request to purchase goods in inventory, wherein filtering the aggregated inventory data is based on filter data within the received request corresponding to a geographic area including a plurality of retail outlet sources including the retail outlet source, the supply location source from which the retail outlet source obtains a supply of retail goods, and the transit service source that routes the retail goods between the supply location source and the retail outlet source;

reducing the filtered inventory data with the reserve inventory at the retail outlet source; and distributing the reduced and filtered inventory data to the requesting device over the distributed network.

9. The computer instructions of claim 8, further comprising presenting the filtered inventory data on the requesting device.

* * * * *